United States Patent [19]

Heinz et al.

[11] Patent Number: 4,818,923
[45] Date of Patent: Apr. 4, 1989

[54] METHOD OF, AND APPARATUS FOR, REGULATING THE ROTATIONAL SPEED OF AN ELECTRIC MOTOR IN A FOUR QUADRANT MODE OF OPERATION

[75] Inventors: Kurt Heinz, Buchs; Johannes Felber, Dietikon, both of Switzerland

[73] Assignee: Willi Studer AG, Regensdorf, Switzerland

[21] Appl. No.: 8,767

[22] Filed: Jan. 30, 1987

[30] Foreign Application Priority Data

Feb. 11, 1986 [CH] Switzerland ............... 544/86

[51] Int. Cl.[4] .............................................. H02D 5/00
[52] U.S. Cl. .................................. 318/318; 318/326; 318/345 C
[58] Field of Search ............. 318/490, 449, 721, 293, 318/630, 257, 457, 376, 140–148, 306, 308–318, 326–328, 345

[56] References Cited

U.S. PATENT DOCUMENTS

| 3,229,181 | 1/1966 | Evans | 318/293 |
| 3,378,740 | 4/1968 | Cruel | 318/630 |
| 3,810,251 | 5/1974 | Blanyer | 290/40 |
| 3,887,856 | 6/1975 | Cicchiello | 318/391 |
| 3,924,168 | 12/1975 | Woodward | 318/257 |
| 3,944,901 | 3/1976 | Janssen et al. | 318/318 |
| 4,074,642 | 2/1978 | Herr | 318/568 |
| 4,284,931 | 8/1981 | Ehret | 318/318 |
| 4,319,170 | 3/1982 | Brent | 318/376 |
| 4,527,496 | 7/1985 | Kemmel | 318/305 |
| 4,605,884 | 8/1986 | Miyagi | 318/314 |
| 4,695,778 | 9/1987 | Chito et al. | 318/314 |

OTHER PUBLICATIONS

Publication by J. M. Stephenson entitled "Thyristor FED D.C. Drives"; Proceedings of the First European Conference on Electrical Drives/Motors/Controls '82, Jun. 29 to Jul. 1, 1982, by The University of Leeds, UK.

*Primary Examiner*—William M. Shoop, Jr.
*Assistant Examiner*—David Martin
*Attorney, Agent, or Firm*—Werner W. Kleeman

[57] ABSTRACT

An inexpensive and reliable regulating apparatus contains between a regulating unit and an electric motor series-connected therewith a feedback path for a single tachometer signal and including a band-pass filter. The band-pass filter determines the operating range of the electric motor. The regulating unit is constructed such that during operation the electric motor is supplied with power only when a signal from the feedback path arrives at the regulating unit. Under the action of external disturbances the supply of power is interrupted at least for a predetermined duration of time.

15 Claims, 1 Drawing Sheet

METHOD OF, AND APPARATUS FOR, REGULATING THE ROTATIONAL SPEED OF AN ELECTRIC MOTOR IN A FOUR QUADRANT MODE OF OPERATION

BACKGROUND OF THE INVENTION

The present invention relates to a new and improved method of, and apparatus for, regulating the rotational speed of an electric motor operated in the four quadrant mode of operation.

In its more particular aspects, the present invention specifically relates to a new and improved method of, and apparatus for, regulating the rotational speed of an electric motor operated in the four quadrant mode of operation and in which method and apparatus there is provided a regulating unit with which the electric motor is series connected and which supplies variable power to the electric motor.

For regulating the rotational speed, namely the number of revolutions per unit of time, of an electric motor intended for the four quadrant mode of operation it is standard practice to derive from the electric motor two tachometer data and to compare such two tachometer data with predetermined reference values. Deviations between the thus derived tachometer data and the reference values result in generally known actions on the regulation circuit. As the tachometer data there are conventionally provided two signals having a magnitude which is proportional to the rotational speed of the electric motor. From these two signals there can also be derived the rotational direction of the electric motor. In this manner there is rendered a reliable regulation of the electric motor such that there do not occur any operating states which could lead to inappropriate regulatory actions.

It is one disadvantage of this known regulation method for regulating electric motors such that a predetermined rotational speed is maintained at high precision, that the necessary tachometers for obtaining the two tachometer data concerning rotational speed and rotational direction, are complex and very expensive. It is well known that this is increasingly so with increasing precision requirements.

A circuit for stabilizing the speed of a DC-motor is known, for example, from U.S. Pat. No. 3,944,901, granted Mar. 16, 1976. The DC-motor is connected with a tachometer and an amplifier for controlling the DC-motor. A resonant circuit is interconnected between the output of the tachometer and the input of the amplifier and suppresses interfering frequencies in the output signal of the tachometer and furthermore amplifies the output signal of the tachometer.

It is one disadvantage of this circuit that such circuit is unsuitable for regulating the rotational speed of the DC-motor through a wide range of rotational speeds. The reason is that the resonant circuit can be laid out only for one frequency, namely the resonant frequency. When operation is desired in a number of quadrants, this circuit also requires an additional tachometer signal indicating the running direction.

SUMMARY OF THE INVENTION

Therefore, with the foregoing in mind it is a primary object of the present invention to provide a new and improved method of, and apparatus for, regulating the rotational speed of an electric motor operated in the four quadrant mode of operation and which method and apparatus require less expensive components and yet ensure high reliability and high precision in the regulation of the rotational speed of the electric motor.

Now in order to implement these and still further objects of the present invention, which will become more readily apparent as the description proceeds, the method of the present development is manifested by the features that, there is generated a signal which has a magnitude which is in a predetermined relationship, typically for instance a proportional relationship to the rotational speed of the electric motor and that there is provided a reference signal with respect to the aforementioned signal proportional to the rotational speed of the electric motor. There is defined an acceptable range for the magnitude of the signal proportional to the rotational speed of the electric motor. The signal proportional to the rotational speed of the electric motor is continuously compared with the reference signal and the power supplied to the electric motor is regulated in correspondence to the result of this comparison of the signal proportional to the rotational speed of the electric motor with the related reference signal. The power supplied to the electric motor is controlled in accordance with the result of the aforementioned comparison as long as the magnitude of the signal proportional to the rotational speed of the electric motor is within the acceptable range. The supply of power to the electric motor is interrupted for a predetermined duration of time if the signal proportional to the rotational speed of the electric motor assumes a magnitude outside the aforementioned acceptable range.

As alluded to above, the invention is not only concerned with the aforementioned method aspects, but also relates to a novel construction of an apparatus for regulating the rotational speed of an electric motor operated in the four quadrant mode of operation.

To achieve the aforementioned measures, the inventive apparatus, in its more specific aspects, comprises:

a regulating unit to which the electric motor is series connected;

a feedback path between the electric motor and the regulating unit; and the feedback path contains a single tachometer unit operatively connected with the electric motor and a band-pass filter series connected to the single tachometer unit.

It is one particular advantage of the inventive apparatus that there is only required a single tachometer information or data derived from the electric motor and this derived information or data concerns the rotational speed of the electric motor. Nonetheless, the specific operation of the inventive method and the particular construction of the apparatus according to the invention still do not permit the appearance of uncontrollable states or conditions in the regulation circuit or automatic control loop. The events occurring in the regulation circuit or automatic control loop, therefore, are always unequivocally defined. Furthermore, the response time is sufficiently short in the case of external disturbances of or actions on the regulation circuit or automatic control loop so that damage can be avoided to systems or loads which are driven by the thus regulated electric motor. A four quadrant mode of operation of the electric motor thus is rendered possible using only a single tachometer information or data. This apparatus is well suited for regulating electric motors particularly for record players and capstan shafts.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
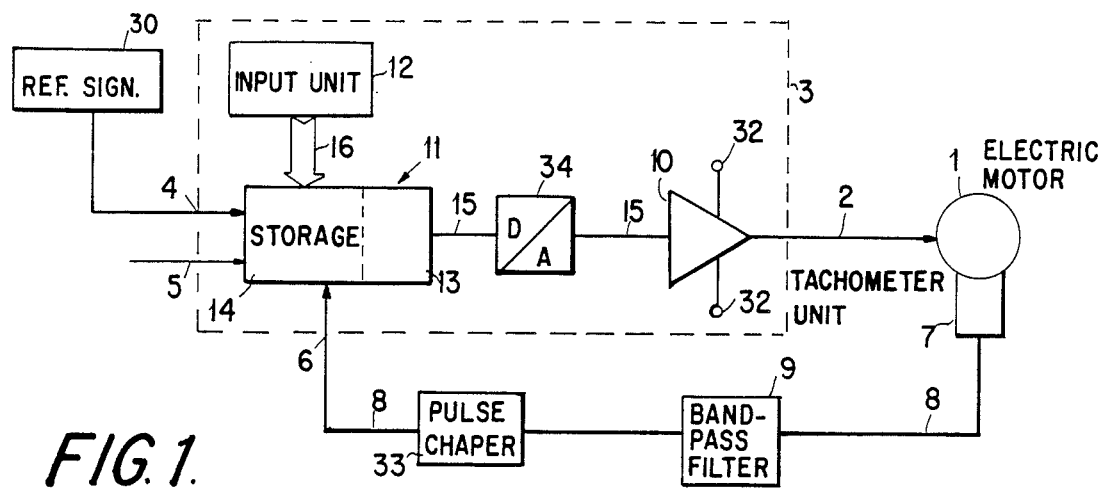
FIG. 1 shows a schematic block diagram of an exemplary embodiment of the inventive apparatus for regulating an electric motor.

Describing now the drawings, it is to be understood that only enough of the construction of the regulating apparatus has been shown as need for those skilled in the art to readily understand the underlying principles and concepts of the present development, while simplifying the showing of the drawings. Turning attention now specifically to FIG. 1 of the drawings, there has been illustrated therein by way of example and not limitation a regulating apparatus for regulating the rotational speed of an electric motor 1 which, in the illustrated exemplary embodiment, constitutes a DC-motor.

The electric motor 1 is series connected to a regulating unit 3 by means of one or more electric lines or conductors 2.

The regulating unit 3 contains reference input means 4, 5 for inputting reference signals, namely a first reference input 4 for inputting a reference signal which originates from a reference signal source 30 and is related to, for example, is proportional to a desired or reference rotational speed of the electric motor 1 and a second reference input 5 for inputting a second reference signal which is related to a desired or reference direction of rotation of the electric motor 1. The regulating unit 3 further contains a single input or single signal input 6 receiving a single signal originating from a tachometer unit or tachometer 7 which is connected with the electric motor 1 or even may form part thereof. A line or conductor 8 connects the tachometer unit 7 with the single input 6 of the regulating unit 3 and constitutes a feedback path from the electric motor 1 via the tachometer unit 7 to the regulating unit 3. A band-pass filter 9 and a pulse shaper like, for example, a Schmitt-trigger 33 are incorporated into the feedback path formed by the line or conductor 8.

The regulating unit 3 essentially contains a power amplifier 10, a processor 11 and an input unit 12. The processor 11 includes a computer unit 13 and storage means 14 and is connected by means of a line or conductor 15 with the power amplifier 10 which, in turn, is connected to the line or conductor 2. A digital-analog converter 34 is incorporated into the line or conductor 15 if not already included in processor 11.

The power amplifier 10 is known as such and is a conventional component which, therefore, is not further described herein. Terminals 32 for external power supply are provided at the power amplifier 10. The processor 11 also is a known commercially available component, for example, of the type 8051. The input unit 12 is connected to the processor 11 by means of a data bus 16. The input data on the data bus 16 and the reference signals available at the reference inputs 4 and 5 are fed to the processor 11.

Figure 2:
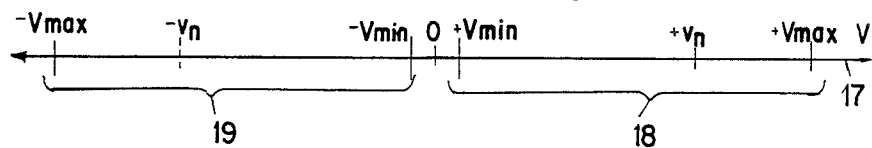
FIG. 2 is an illustration showing the rotational speeds of the electric motor in the apparatus shown in FIG. 1.

In FIG. 2 there are plotted on an axis 17 values v of the rotational speed of the electric motor 1. To the right of the zero point the values for the rotational speed in one rotational direction are entered as positive values. To the left of the zero point the values for the rotational speed in the opposite rotational direction are entered as negative values. For example, the value vn is entered as a value of the desired or nominal rotational speed to be attained under the action of the regulating unit 3. The values +vmin and +vmax as well as −vmin and −vmax define predetermined ranges 18 and 19 of acceptable values of the rotational speed. Signals having values and ranges of acceptable values which are related, for instance, specifically proportional to the aforementioned rotational speed values v in the predetermined ranges 18 and 19 of acceptable values, are present in the feedback path formed by the line or conductor 8 and originate in the form of signals of different frequencies from the tachometer unit 7. The ranges of acceptable frequencies corresponding to the ranges 18 and 19 are defined by the limit or boundary frequencies of the band-pass filter 9.

Figure 3:
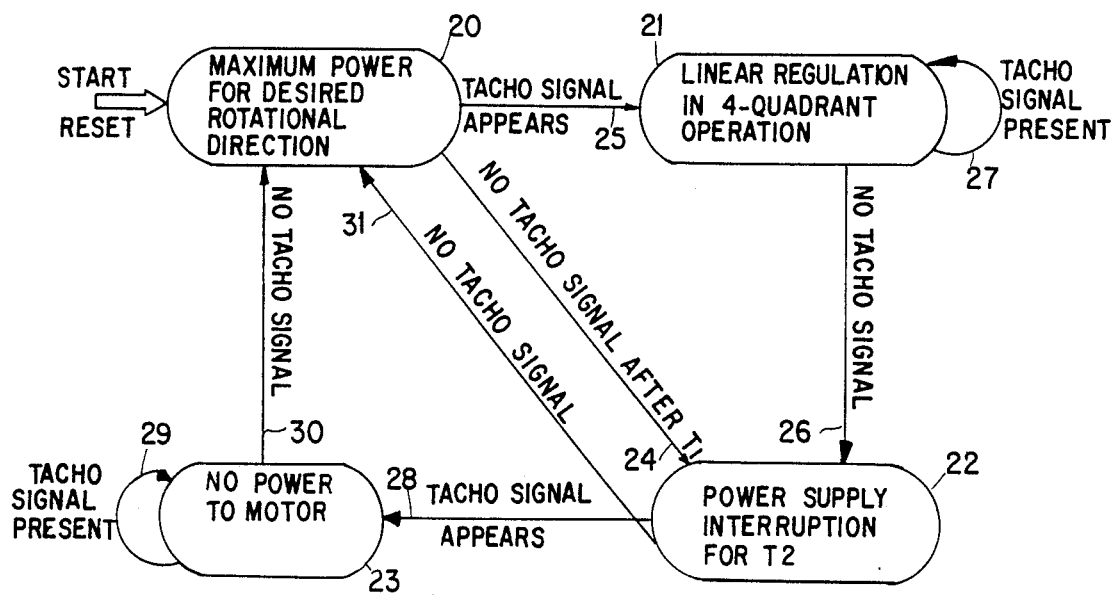
FIG. 3 is a schematic illustration of various possible operating states of the apparatus shown in FIG. 1 when carrying out an exemplary embodiment of the inventive regulating method.

FIG. 3 schematically illustrates possible operative states or conditions of the regulating system described hereinbefore. In this particular case there are indicated the four different operative states or conditions 20, 21, 22 and 23. Each of these operative states or conditions which the inventive apparatus may assume, is determined by signals on the lines or conductors 2, 8 and 15 as well as by a regulating characteristic followed by the processor 11. This will be better understood from the following description of the individual operative states or conditions 20 to 24.

The apparatus according to the invention is set into operation by means of the input unit 12 which includes related input means such as keys, switches, et cetera. During such input operation a predetermined value for the rotational speed and the rotational direction is entered and corresponds, for example, to +vn. Such value also may be present at the reference input means 4 and 5 of the regulating unit 3 and therefore are also present at the processor 11. There can be input any rotational speed values within the predetermined ranges 18 and 19 of acceptable values.

The power amplifier 10 is now directed by the processor 11 via the line or conductor 15 to provide full power to the electric motor 1 via the line or conductor 2 such that the rotational speed of the electric motor 1, starting from zero, increases towards +vn. As soon as the rotational speed has departed from the value "0", the tachometer unit 7 supplies a signal to the band-pass filter 9 through the feedback path, i.e. the line or conductor 8. The signal generated by the tachometer unit 7 is related to the momentary rotational speed of the electric motor 1 according to a predetermined relationship, for example, proportional to such momentary rotational speed. Usually the tachometer unit 7 generates an electric signal of an amplitude varying with time at a frequency which is related to the rotational speed of the electric motor. This electrical signal may constitute, for instance, a sinusoidal oscillation oscillating at the aforementioned frequency which, for example, is proportional to the momentary rotational speed of the electric motor 7.

Immediately after the start-up of the electric motor 1, the signal generated by the tachometer unit 7 has a value which is smaller than the frequency corresponding to the momentary rotational speed value +vmin which, as shown in FIG. 2, represents the minimum acceptable value associated with the predetermined range 18 of acceptable rotational speed values. Therefore, this signal is eliminated by the band-pass filter 9 so that no signal appears at the single input 6 of the regulating unit 3. With reference to FIG. 3, the regulating apparatus is in the operative or starting state or condition 20.

A predetermined time period T1 is preset and stored in the processor 11. The rotational speed of the electric motor 1 must have attained the value +vmin at least within this predetermined time period T1. If this condition is met, the signal generated by the tachometer unit 7 no longer is eliminated by the band-pass filter 9 and thus can reach the regulating unit 3. If this condition is not met within the predetermined time period T1, the regulating apparatus changes over into the operative or control state or condition 22 and the supply of power to the electric motor 1 is interrupted as will be explained in still more detail hereinafter. This change-over is indicated in FIG. 3 by means of the arrow 24.

If the rotational speed +vmin is attained within the predetermined time period T1, the signal which is generated by the tachometer unit 7 and related to the momentary rotational speed of the electric motor 1, passes through the band-pass filter 9 and is applied to the single signal input 6 of the regulating unit 3. As a consequence and as indicated by the arrow 25, the regulating apparatus switches over to the operative or regulating state or condition 21 shown in FIG. 3. In the feedback path represented by the line or conductor 8, the Schmitt-trigger 33 follows the band-pass filter 9 and converts the, for example, sinusodial oscillation, i.e. the tachometer generated signal into a pulse sequence or train. Thus, the signal present at the single signal input 6 of the regulating unit 3 is suitable to be further processed by the digitally operating processor 11.

In the operative states or regulating state or condition 21 the regulating apparatus operates in a manner which is known as such and in accordance with the characteristics of a four quadrant mode of operation. During this operation, deviations from the desired rotational speed +vn result in corresponding corrections either by supplying more power or by generating for a brief period of time a braking moment or torque which is achieved by supplying oppositely poled power. In this operative state or condition 21 the regulating unit 3 normally always receives the signal from the tachometer unit 7 as indicated by the arrow 27 in FIG. 3.

Due to unexpected external influences or effects the rotational speed of the electric motor 1 may be altered to such extent that the rotational speed assumes a value outside the predetermined range 18 of acceptable values. As a consequence the associated electrical signals applied by the tachometer unit 7 to the feedback path represented by the line or conductor 8, is suppressed by the band-pass filter 9. This is indicated in FIG. 3 by the arrow 26. A predetermined time duration T2 is preset and stored in the processor 11. The supply of power to the electric motor 1 by the power amplifier 10 is interrupted for the predetermined duration T2 of time if the aforementioned condition arises, i.e. the momentary rotational speed of the electric motor 1 assumes a value outside the predetermined range 18 of acceptable values. This condition is indicated in FIG. 3 as the operative or control state or condition 22. If under this condition the tachometer generated signal further appears at the single input or single signal input 6 of the regulating unit 3, for instance, because the electric motor 1 is externally driven, the supply of power to the electric motor 1 is not resumed even after expiration of the predetermined time duration T2. This situation is indicated by the operative or control state or condition 23 and the arrows 28 and 29 in FIG. 3. If the tachometer generated signal no longer appears at the single signal input 6 of the regulating unit 3, the supply of power to the electric motor 1 can be resumed. As a consequence, the regulating apparatus changes over to the operative or starting state or condition 20 as indicated by the arrows 30 and 31 in FIG. 3.

Assuming that, for example, the rotational speed of the electric motor 1 is reversed under the action of undesired external influences or effects, the regulating apparatus first changes form the operative or regulating state or condition 21 to the operative or control state or condition 22 as shown in FIG. 3 because a zero-crossing of the rotational speed is unavoidable under these conditions. Subsequently there appears a tachometer generated signal at the single signal input 6 of the regulating unit 3 although no power is delivered. Consequently, the regulating apparatus assumes the operative or control state or condition 23 shown in FIG. 3. This operative or control state or condition 23 will be effective until the undesired influences or effects decline and the rotational speed reaches the zero value.

If, for instance, the electric motor 1 is externally driven such as to assume a rotational speed higher than the desired value ±vn and outside the predetermined range 18 or 19 of acceptable values, as the case may be, the electric motor 1 must be supplied with power of such polarity that there is generated a braking moment or torque. When now the regulating apparatus is turned on, there appears at the reference input 4 of the regulating unit 3 a reference signal related to the desired or reference rotational speed ±vn. At the reference input 5 of the regulating unit 3 there appears a reference signal related to the desired or reference rotational direction. No tachometer generated signal appears at the single signal input 6 of the regulating unit 3, which signal is related to the momentary rotational speed of the electric motor 1. This is due to the fact that, as explained hereinbefore, the momentary rotational speed is outside the predetermined range 18 or 19 of acceptable values so that the related tachometer generated signals on the feedback path represented by the line or conductor 8, are suppressed by the band-pass filter 9. As long as the predetermined time period T1 has not elapsed, power is supplied to the electric motor 1 and further accelerates the same. These steps correspond to those proceeding in the operative or control state or condition 20 shown in FIG. 3.

When after expiration of the predetermined time period T1 the tachometer generated signal is still suppressed by the band-pass filter 9, no signal is present at the single signal input 6 of the regulating unit 3. Consequently, and as already explained hereinbefore, the regulating apparatus assumes the operative or control state or condition 22. Thus, the supply of power to the electric motor 3 is interrupted. In the case that there still does not appear a tachometer generated signal at the single signal input 6 of the regulating unit 3, the regulating apparatus reverts to the operative or starting state or condition 20. This sequence of steps is repeated until the electric motor 1 ceases to be externally driven.

In this manner the electric motor 1 is protected against over-heating and final destruction because the electric motor 1 is unable to prevail against the external drive source. The same sequence of steps is carried out when an external resistance prevents the electric motor 1 from reaching the rotational speed ±vmin either within the predetermined time period T1 or not at all. When the undesired external influences or effects become ineffective, the electric motor 1 resumes operation at the desired rotational speed under the regulating action of the inventive apparatus as described hereinbefore.

The illustration in FIG. 3 thus indicates the type of signal which is required on the lines or conductors 15 and 2 in the presence of certain signals at the reference inputs 4 and 5 and the single signal input 6 of the regulating unit 3. The operative states or conditions 20, 21, 22 and 23 indicate the properties of the signals present on the lines or conductors 15 and 2. The arrows 24 to 31 indicate the type of signal present at the single signal input 6 of the regulating unit 3.

The feedback path represented by the line or conductor 8, conjointly with the tachometer unit 7 and the band-pass filter 9, for example, can be constructed such that the band-pass filter 9 is replaced by a high-pass filter and a low-pass filter. This may be necessary when a wide pass band is required for the band-pass filter 9. It is, however, also conceivable that the tachometer unit 7 already possesses a high-pass characteristic. This is possible, for example, for capacitive-type tachometers. In such case the tachometer already forms part of the band-pass filter and there remains only a low-pass filter.

The regulating apparatus may operate without a tachometer signal indicating the rotational direction, when the desired rotational speed is within the predetermined ranges 18 and 19 of acceptable values. The linear regulation in the four quadrant mode of operation does not operate at rotational speeds in the zero region and also does not operate outside the predetermined ranges 18 and 19 of acceptable values. However, this type of regulation ensures absence of damage to the electric motor at rotational speeds outside such predetermined ranges 18 and 19.

While there are shown and described present preferred embodiments of the invention, it is to be distinctly understood that the invention is not limited thereto, but may be otherwise variously embodied and practiced within the scope of the following claims.

Accordingly, what we claim is:

1. A method of regulating the rotational speed of an electric motor operating in the four quadrant mode of operation, said method comprising the steps of:
    supplying a variable power to the electric motor and thereby driving said electric motor at variable rotational speed;
    generating a signal having a value which is related in accordance with a predetermined relationship to the momentary rotational speed of said electric motor;
    preselecting a predetermined range of acceptable values for said rotational speed of said electric motor and for the values of said signal related to said momentary rotational speed of said electric motor;
    supplying, from a reference signal source, a reference signal related to a desired rotational speed of said electric motor;
    continuously comparing with one another said reference signal related to said desired rotational speed of said electric motor and said signal related to said momentary rotational speed of said electric motor;
    regulating said variable power supplied to said electric motor according to the results of said comparison of said reference signal related to said desired rotational speed of said electric motor and said signal related to said momentary rotational speed of said electric motor, provided said rotational speed of said electric motor falls within said predetermined range of acceptable values of said rotational speed;
    interrupting the supply of regulated power to said electric motor when said signal related to said momentary rotational speed of said electric motor is associated with a rotational speed outside said predetermined range of acceptable values of said rotational speed;
    controlling a supply of predetermined power to said electric motor after at least one predetermined duration of time following said step of interrupting the supply of regulated power to said electric motor; and
    resuming said step of supplying said regulated power after said electric motor, under the controlled supply of said predetermined power, has again assumed said rotational speed within said predetermined range of acceptable values of said rotational speed.

2. The method as defined in claim 1, wherein:
    said step of generating said signal related to said momentary rotational speed of said electric motor entails the step of generating as said signal, a signal having a frequency related to said momentary rotational speed of said electric motor;
    said step of supplying said reference signal entailing the step of supplying as said reference signal, a signal having a frequency related to said desired rotational speed of said electric motor; and
    said step of preselecting said predetermined range of acceptable values of said signal related to said momentary rotational speed of said electric motor entailing the step of filtering said signal in accordance with a predetermined band-pass characteristic.

3. The method as defined in claim 1, further including the steps of:
    activating said electric motor during a start-up phase of the operation;
    selecting a predetermined time period immediately following said step of activating said electric motor;
    supplying a predetermined power to said electric motor during said predetermined time period;
    carrying out said step of regulating said variable power, provided that said electric motor assumes said rotational speed within said predetermined range of acceptable values of said rotational speed after expiration of said predetermined time period; and
    repeating, after a predetermined time duration, said step of supplying said predetermined power to said electric motor during said predetermined time period in the event that said electric motor fails to assume said rotational speed within said predetermined range of acceptable values of said rotational speed after expiration of said predetermined time period.

4. The method as defined in claim 1, wherein:
during said step of controlling said supply of predetermined power to said electric motor, delaying said supply of predetermined power to said electric motor for a time duration predetermined by the appearance of said signal related to said momentary rotational speed of the electric motor and having a value within said predetermined range of acceptable values and, after disappearance of said signal, supplying said predetermined power to said electric motor during a predetermined time period.

5. The method as defined in claim 1, wherein:
during said step of controlling said supply of predetermined power to said electric motor, delaying the supply of predetermined power to said electric motor for a predetermined duration of time and supplying said predetermined power to said electric motor after expiration of said predetermined duration of time for a predetermined time period; and
repeating said steps of delaying and supplying said predetermined power in the event that said electric motor fails to assume said rotational speed within said predetermined range of acceptable values of said rotational speed after expiration of said predetermined time period.

6. The method as defined in claim 1, wherein:
said step of generating said signal related to said momentary rotational speed of said electric motor entails generating as said signal, a single signal having a value which is proportional to said momentary rotational speed of said electric motor.

7. An apparatus for controlling the rotational speed of an electric motor operated in the four quadrant mode of operation, said apparatus comprising:
a regulating unit with which the electric motor is series connected;
said regulating unit assuming a regulating state for regulating the supply of power to said electric motor when said electric motor assumes a rotational speed within a predetermined range of acceptable values of said rotational speed;
a feedback path between said electric motor and said regulating unit;
said feedback path comprising:
a single tachometer unit connected to said electric motor;
a band-pass filter series connected to said single tachometer unit;
said regulating unit assuming predetermined control states for controlling the supply of a predetermined power to said electric motor after at least one predetermined duration of time once said electric motor assumes a rotational speed outside said predetermined range of acceptable values of said rotational speed; and
said regulating unit reverting to said regulating state after said electric motor has again assumed said rotational speed within said predetermined range of acceptable values of said rotational speed as a result of the controlled supply of said predetermined power to said electric motor in one of said predetermined control states of said regulating unit.

8. The apparatus as defined in claim 7, wherein:
said regulating unit contains a processor and a power amplifier series connected to said processor in order to thereby produce the four quadrant mode of operation of said electric motor.

9. The apparatus as defined in claim 8, wherein:
said processor contains a computer and storage means operatively associated therewith.

10. The apparatus as defined in claim 7, further including:
an input unit operatively associated with said regulating unit.

11. The apparatus as defined in claim 7, wherein:
said regulating unit contains a single input receiving said single signal originating from said single tachometer unit and related in a predetermined relationship to the momentary rotational speed of said electric motor;
said regulating unit further containing reference input means;
said reference input means containing a first reference input for inputting a first reference signal related to a desired rotational speed of said electric motor; and
said reference input means further including a second reference input for inputting a second reference signal related to a desired direction of rotation of said electric motor.

12. The apparatus as defined in claim 11, wherein:
said single tachometer unit generates, as said single signal, a single signal having a value which is proportional to said momentary rotational speed of said electric motor.

13. The apparatus as defined in claim 7, wherein:
said regulating unit, during a starting phase of the operation and prior to assuming said regulating state, assuming a starting state for supplying a predetermined power to said electric motor during a predetermined time period;
said regulating unit changing over from said starting state to said regulating state in response to a signal indicating that the electric motor operates at said rotational speed within said predetermined range of acceptable values of said rotational speed after expiration of said predetermined time period; and
said regulating unit repeating, after a predetermined time duration, said step of supplying said predetermined power to said electric motor during said predetermined time period in the event that there fails to appear said signal indicating that said electric motor has assumed said rotational speed within said predetermined range of acceptable values of said rotational speed after expiration of said predetermined time period.

14. The apparatus as defined in claim 7, wherein:
said regulating unit, during one of said predetermined control states, delaying said supply of predetermined power to said electric motor for a predetermined time duration during which there appears a signal indicative of a rotational speed of said electric motor within said predetermined range of acceptable values of said rotational speed and, after disappearance of said signal, supplying said predetermined power to said electric motor during a predetermined time period.

15. The apparatus as defined in claim 7, wherein:

said regulating unit, during an other one of said predetermined control states, delaying said supply of predetermined power to said electric motor for a predetermined duration of time and supplying, for a predetermined time period, said predetermined power to said electric motor after expiration of said predetermined duration of time; and said regulating unit repeating, after said predetermined duration of time, said steps of delaying and supplying said predetermined power to said electric motor in the event that there fails to appear a signal indicating that said electric motor has assumed said rotational speed within said predetermined range of acceptable values of said rotational speed after expiration of said predetermined time period.

* * * * *